April 21, 1970     C. W. RECTOR     3,507,017

ARTICLES FOR MORTICIANS' USE

Filed Aug. 30, 1967     2 Sheets-Sheet 1

INVENTOR.
CHARLES W. RECTOR
BY
Christensen, Sanborn + Matthews
ATTORNEYS

April 21, 1970  C. W. RECTOR  3,507,017
ARTICLES FOR MORTICIANS' USE
Filed Aug. 30, 1967  2 Sheets-Sheet 2

INVENTOR.
CHARLES W. RECTOR
BY
Christenson, Sanborn + Matthews
ATTORNEYS

United States Patent Office 3,507,017
Patented Apr. 21, 1970

3,507,017
ARTICLES FOR MORTICIANS' USE
Charles W. Rector, Seattle, Wash.
(3304 Russell Road, Centralia, Wash. 98531)
Filed Aug. 30, 1967, Ser. No. 664,897
Int. Cl. A01n 1/00
U.S. Cl. 27—21                                              11 Claims

ABSTRACT OF THE DISCLOSURE

Apparatus for morticians' use to maintain the covering of body apertures closed while corpse is on display. The apparatus comprises a generally cup-shaped shield of thin, flexible material of a size to fit the largest corpse. The dimensions of the device may be decreased by manipulation to be suitable for use on a smaller corpse. The cup-shaped shield has at least one marginal portion joined to a central portion by short severable necks. The article is made of a severable material, preferably plastic formed by injection molding techniques. The device may be feathered at its edges and carries a plurality of short, more or less pointed studs distributed over the convex surface thereof to grip and hold the lips or the eyelids closed without piercing or lacing the mucous membrane. The device is placed in the eyes or mouth of a corpse and the upstanding studs engage the inner mucous surface of the eyelid or the inner surface of the lips to hold the eyelids or mouth closed.

SUMMARY OF THE INVENTION

Morticians in preparing a corpse use eye caps engaging the inner mucous surfaces of the eyelids to hold them closed, and expression formers engaging the inner surfaces of the lips to hold them closed. Such an eye cap is shown in my copending application Ser. No. 547,031, filed May 2, 1966, and now Patent No. 3,421,190, and examples of expression formers are discolsed in my Patents Nos. 3,103,052 and 3,195,215.

Eye caps and expression formers are alike in that each must securly yet unobtrusively grip a surface, whether of the eyelids or of the lips, to retain them closed, but should not penetrate the engaged surfaces, for to do so would encourage dehydration such as will itself adversely affect the appearance and the preservation of the corpse. They are alike in another aspect, in that they should be capable of manufacture simply and inexpensively, and should be flexible to fit some variations in corpses, all of which can be done by using injection molding of plastic materials. One of the novel features of this invention, differing from the articles shown in the above-identified patents and application, is the provision of many short, stiff studs or pegs upstanding from the surface to engage the eyelids or the lips, but not to penetrate them, as do the spurs heretofore used, which will in the aggregate as surely grip and hold the lids or lips closed. Another novel feature is to retain all advantages of the former articles yet by the use of the injection molding technique to afford additional advantages, such as thinner articles and edges feathered thin, for further flexibility, ease of fitting, and unobtrusiveness. Also, such eye caps and expression formers are alike in that smaller corpses may require smaller sizes of such articles, yet for simplicity and economy the mortician should be required to have available only a size that will accommodate the largest corpse, but that can be cut down readily to fit a smaller corpse, in the manner suggested in my application Ser. No. 547,031. Such articles when made by the injection molding technique that is peculiarly desirable in providing the type of gripping points of this invention, can also form the slots whereby their size can be readily reduced, all in a single operation.

DETAILED DESCRIPTION

Eye caps and expression formers used heretofore have been stamped from plastic or metal sheets, and then formed by a second operation in generally cup shape. As thus made, it was necessary to form outstanding louvers to engage beneath the eyelids and to hold them closed, as in my application Ser. No. 547,031. This served adequately, but concentrated all the resistance of opening of the lids along the line of the louvers, and the louver edges sometimes penetrated the flesh, which is undersirable. Moreover, the eye cap was substantially even thickness from edge to edge, and lacked as much flexibility, especially at the edges, as was desirable. In addition, the two-step process of manufacture was somewhat expensive. Similar drawbacks were found in expression formers such as are disclosed in my patents noted above.

The eye cap of this invention, shown in FIGURES 1 to 5 at 1, is preferably molded of a plastic material by the injection molding technique. So made, it can be completed in a single operation, formed to convex shape and with its edges feathered, at 2, for excellent flexibility. Slots 3 can be molded at desired locations, generally parallel to and inset from the edges, with narrow necks 4 joining the central portion, inside the inner slot, and the marginal portion. Since the cap is of severable plastic, the necks can readily be severed and trimmed, if the standard size is found to be too large.

Another advantage inherent in the injection molding technique is that short, rather pointed studs or pegs 5 can be molded in, and outstanding from, the convex surface. These studs can be so proportioned, and are sufficiently well distributed over the surface, that although none penetrates the flesh, in the aggregate they grip it firmly, and retain the lids closed. There is no concentration of resistance to opening, and no posibility of penetrating the lids, and so encouraging dehydration, as might occur when outstanding louvers are relied on, and are engaged by a careless or unskilled operator.

Figure 1:
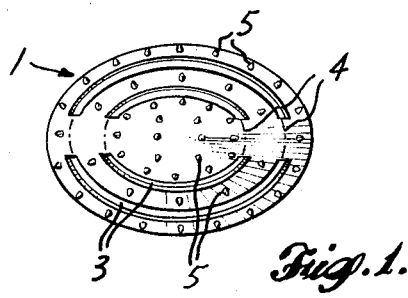
FIGURE 1 is an elevation from above of the invention as applied to an eye cap.
Figure 3:
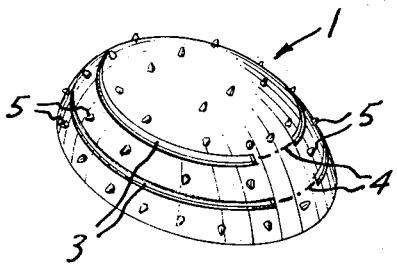
FIGURE 3 is an isometric view of the same, in the single form supplied to the mortician.
Figure 2:
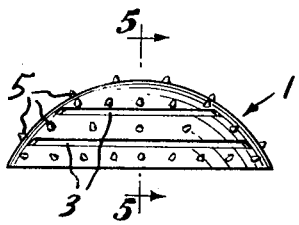
FIGURE 2 is an elevation from one side of the same.
Figure 4:
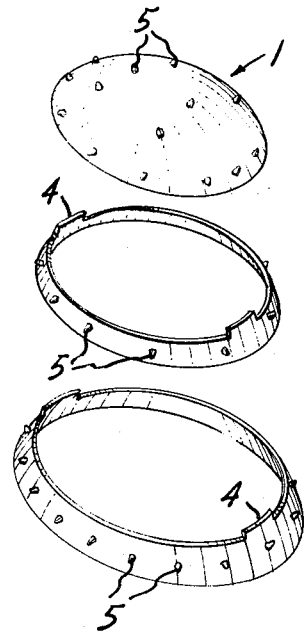
FIGURE 4 is a like view showing the possible reductions in size that can be effected by the invention.
Figure 5:
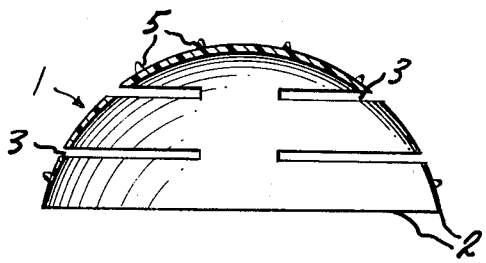
FIGURE 5 is an enlarged cross-sectional view of the eye cap taken along line 5—5 of FIG. 2.
Figure 6:
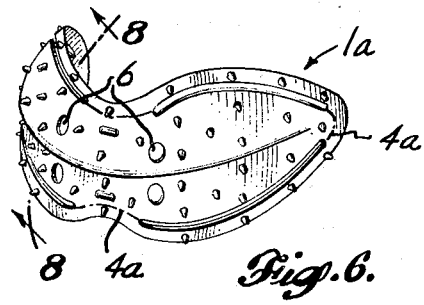
FIGURE 6 is an isometric view of the invention as applied to an expression former.
Figure 7:
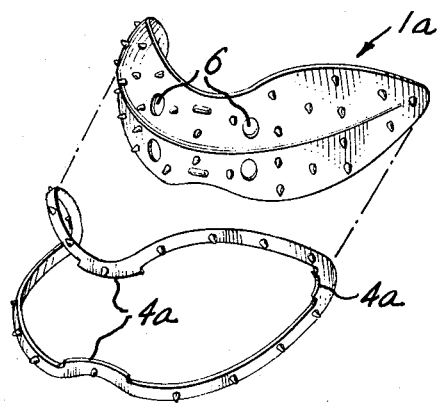
FIGURE 7 is a like view of the same, showing the size reduction possible by use of the invention.
Figure 8:
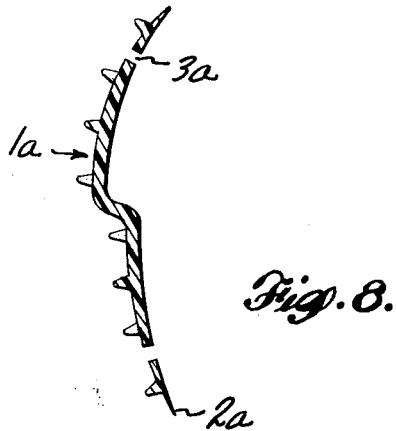
FIGURE 8 is an enlarged cross-sectional view of the expression former taken along line 8—8 of FIG. 6.

The same advantages are present when the invention is incorporated in an expression former 1a, as in FIGURES 6, 7 and 8. Its edges are feathered, at 2a, and usually but a single marginal series of slots 3a, separated by neck 4a, is needed. The convex surface is covered by studs 5a. The holes 6 to accommodate the ties for the jaws are also molded at the same time.

I claim as my invention:

1. An article for morticians' use, comprising a generally cupped shield of thin, flexible material, slotted inwardly of its margin to define an imperforate central portion and at least one marginal portion, said portions being joined by integral, severable necks intermediate the adjacent ends of slots, severance of said necks causing said marginal portion to separate from said central portion.

2. An article as in claim 1, the marginal edge whereof is feathered.

3. An article as in claim 1, having short studs outstanding from its convex surface.

4. An article as in claim 3, wherein the studs are distributed over the marginal portion and the central portion.

5. An article for morticians' use, comprising a generally cupped shield of thin, flexible material, having short studs outstanding from its convex surface, said article having at least one series of slots disposed inwardly of its margin, to define an imperforate marginal portion and a central portion, said portions being joined by severable neck portions intermediate the adjacent ends of said slots.

6. An article as in claim 5 having a plurality of rows of slots, to define one or more intermediate portions in addition to the marginal and central portion.

7. An article as in claim 5, having a single row of slots inwardly of its margin, and formed to fit between the gums and teeth, and the lips.

8. An article for morticians' use, comprising a generally cupped shield of thin, flexible material slotted inwardly of its margin to define a central portion having short studs outstanding from its convex surface, and at least one marginal portion, said portions being joined by integral, severable necks intermediate the adjacent ends of said slots, severance of said necks causing said marginal portion to separate from said central portion.

9. The article of claim 8 wherein said marginal portion carries short studs outstanding from its convex surface.

10. An article as in claim 8 the marginal edge whereof is feathered.

11. An article for morticians' use, comprising a generally cupped shield of thin, flexible material, having short studs outstanding from its convex surface, said article having at least one series of slots disposed inwardly of its margin, to define a marginal portion and a central portion, said portions being joined by severable neck portions intermediate the adjacent ends of said slots.

References Cited

UNITED STATES PATENTS

| 1,016,083 | 1/1912 | Morgan | 27—21 |
| 2,370,850 | 3/1945 | Embser | 27—21 |
| 2,673,984 | 4/1954 | Clarke | 3—13 |

FOREIGN PATENTS

| 15,314 | 6/1911 | Great Britain. |

ANTON O. OECHSLE, Primary Examiner

T. BROWN, Assistant Examiner